United States Patent
Sahara et al.

(10) Patent No.: US 7,061,692 B2
(45) Date of Patent: Jun. 13, 2006

(54) ULTRA-LIGHTWEIGHT ELECTROMAGNETIC WAVE CONCENTRATOR AND METHOD FOR MANUFACTURE THEREOF

(75) Inventors: Hironori Sahara, Kawasaki (JP); Morio Shimizu, Chofu (JP)

(73) Assignee: National Aerospace Laboratory of Japan, Tokyo (JP)

( * ) Notice: Subject to any disclaimer, the term of this patent is extended or adjusted under 35 U.S.C. 154(b) by 0 days.

(21) Appl. No.: 10/635,641

(22) Filed: Aug. 7, 2003

(65) Prior Publication Data

US 2004/0051986 A1    Mar. 18, 2004

(30) Foreign Application Priority Data

Aug. 20, 2002 (JP) .............................. 2002-239694

(51) Int. Cl.
  *G02B 17/00*    (2006.01)
  *G02B 5/10*     (2006.01)

(52) U.S. Cl. ...................................... 359/726; 359/853

(58) Field of Classification Search ........ 359/726–728, 359/741, 708, 712, 838, 846, 848, 853
See application file for complete search history.

(56) References Cited

U.S. PATENT DOCUMENTS

| | | | | |
|---|---|---|---|---|
| 1,382,261 | A | * | 6/1921 | Akeley ........................ 359/853 |
| 4,171,563 | A | | 10/1979 | Withoos |
| 4,733,246 | A | | 3/1988 | Rubin et al. |
| 4,743,095 | A | * | 5/1988 | Dane ........................... 359/853 |
| 4,875,467 | A | * | 10/1989 | Murphy ....................... 359/853 |
| 6,811,271 | B1 | * | 11/2004 | Hayakawa et al. ......... 359/846 |

FOREIGN PATENT DOCUMENTS

| | | |
|---|---|---|
| JP | 62-168402 | 7/1987 |
| JP | 5-305622 | 11/1993 |
| JP | 6-6127 | 1/1994 |

* cited by examiner

*Primary Examiner*—Alicia M Harrington
(74) *Attorney, Agent, or Firm*—Westerman, Hattori, Daniels & Adrian, LLP.

(57) ABSTRACT

This electromagnetic wave concentrator having high rigidity and flexibility is suitable for communications and is produced by molding using stress relaxation in thin-film material. An ultra-lightweight electromagnetic wave concentrator is obtained by increasing the rigidity by forming a thin-film curved body of an electromagnetic wave reflective surface having a paraboloid shape. Reinforcing grooves in the reflective surface increase rigidity. To form the reflective surface shape and the reinforcing grooves, pressure is applied to the thin-film material with a molding die, or the thin-film material is attached to the molding die by pressure while heating the thin-film material with a heating device, such as a thermostatic chamber.

5 Claims, 7 Drawing Sheets

Fig. 1-A
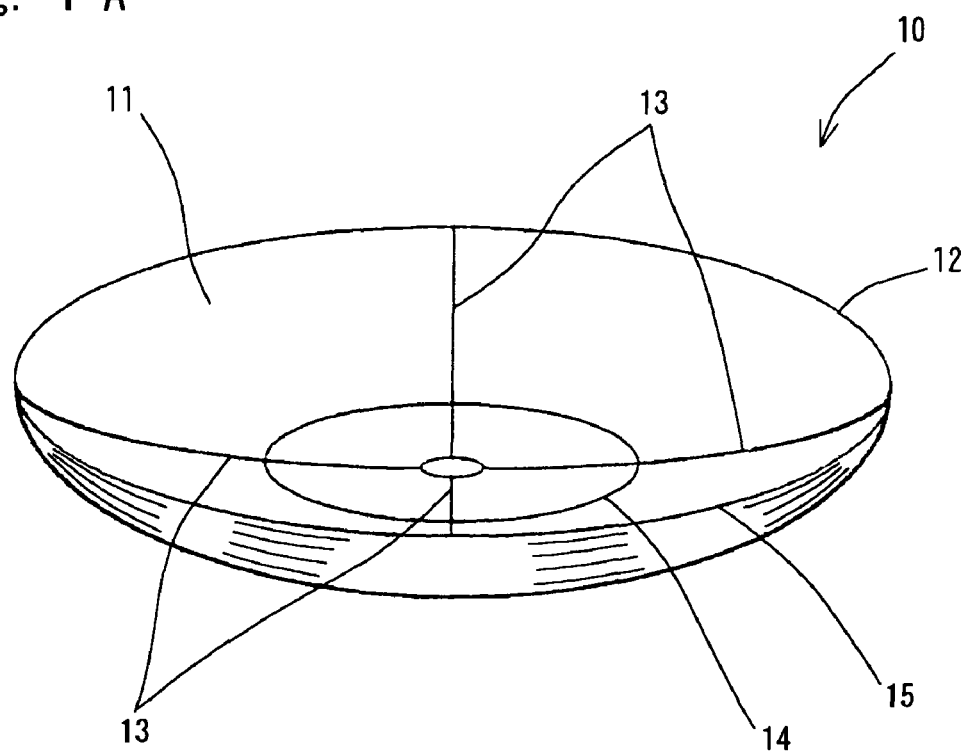
Fig. 1-B
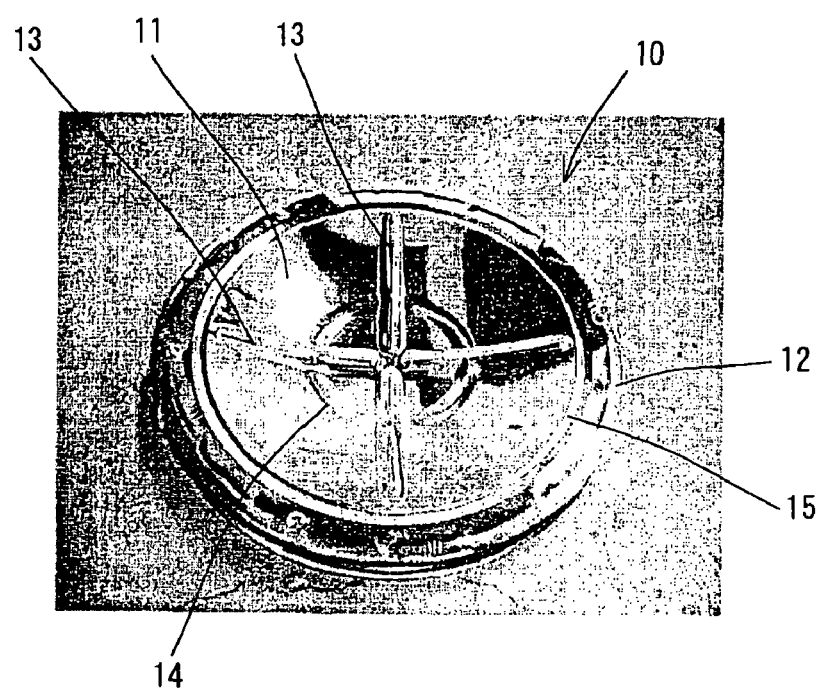

Fig. 2-A
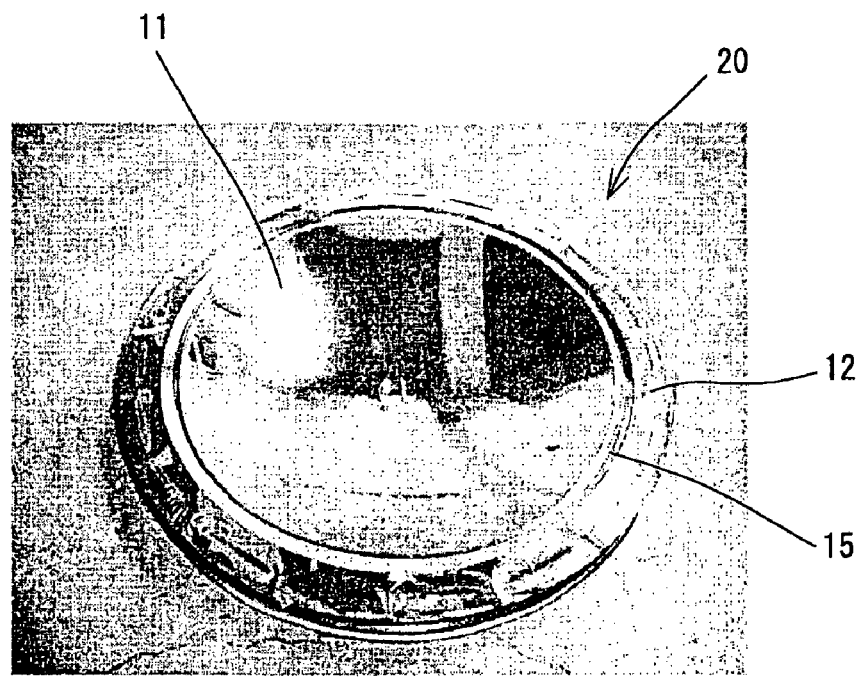
Fig. 2-B
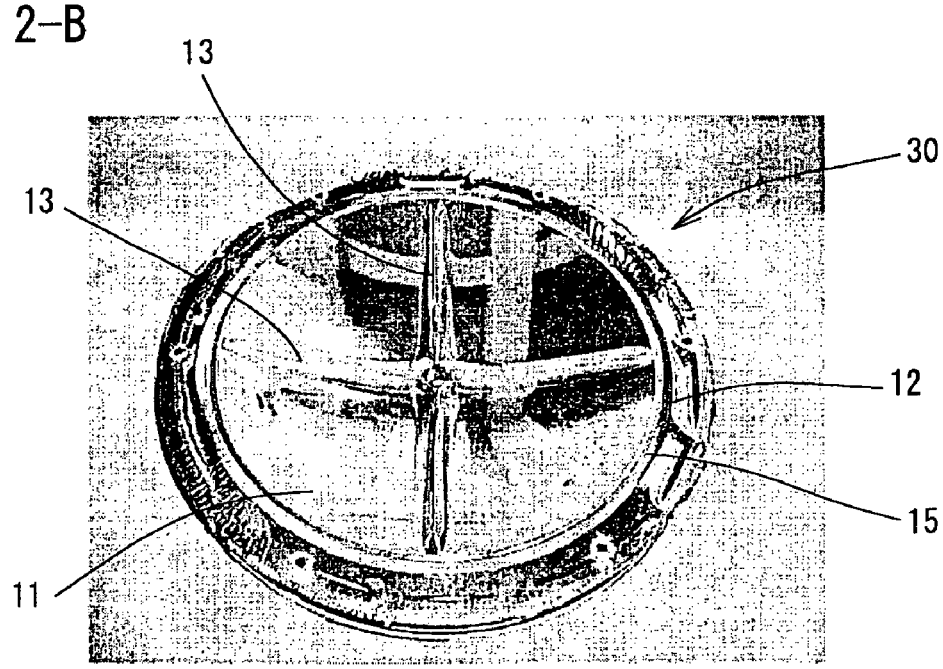

Fig. 4-A
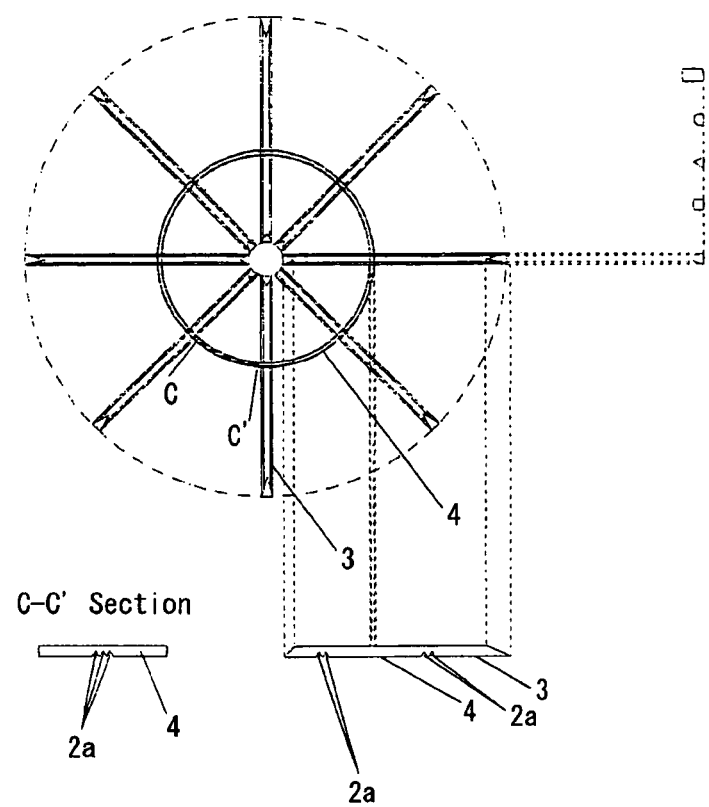
C-C' Section
Fig. 4-B
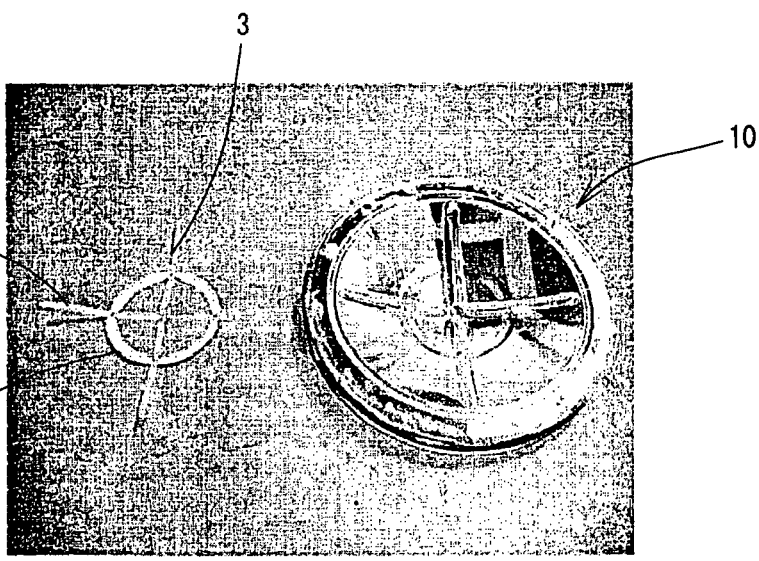

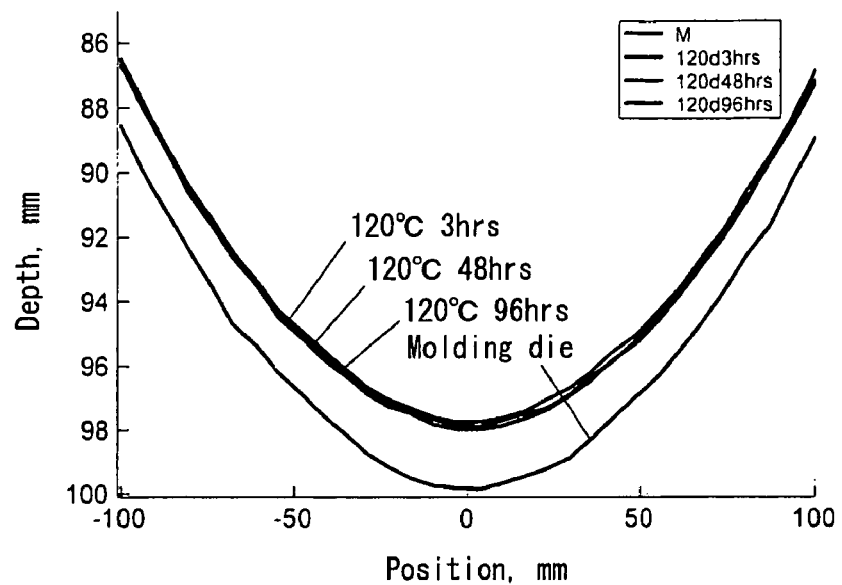
Fig. 5-A
Fig. 5-B
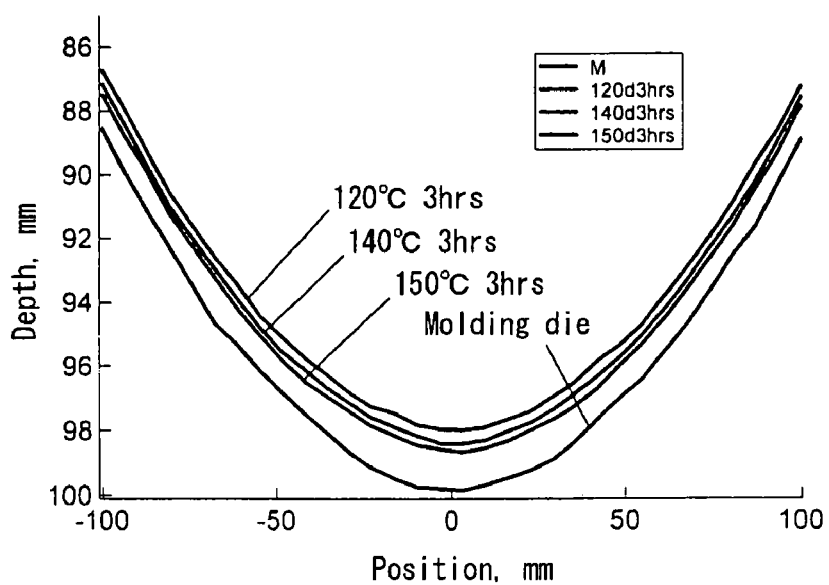

Fig. 6-A
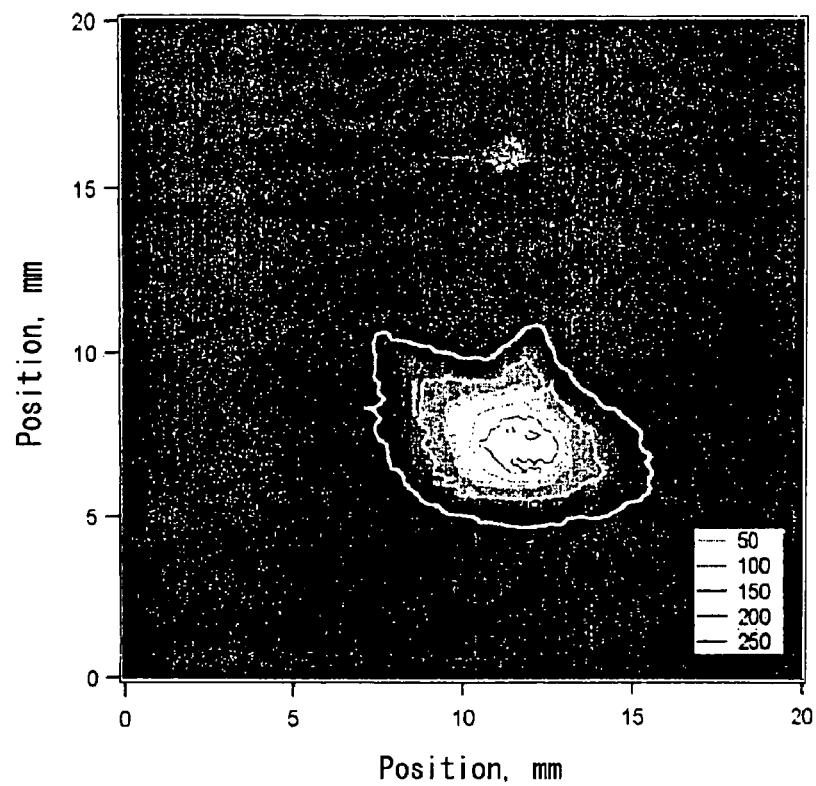
Fig. 6-B
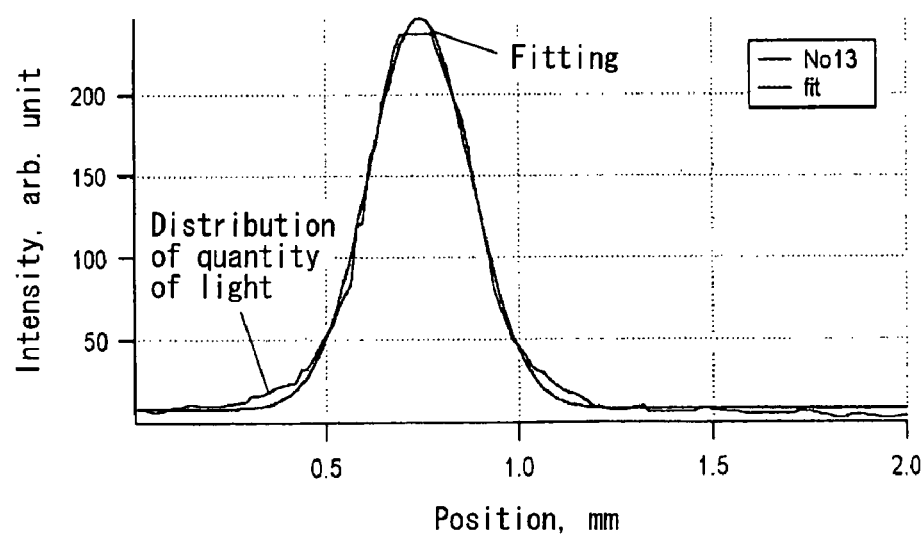

Fig. 7-A
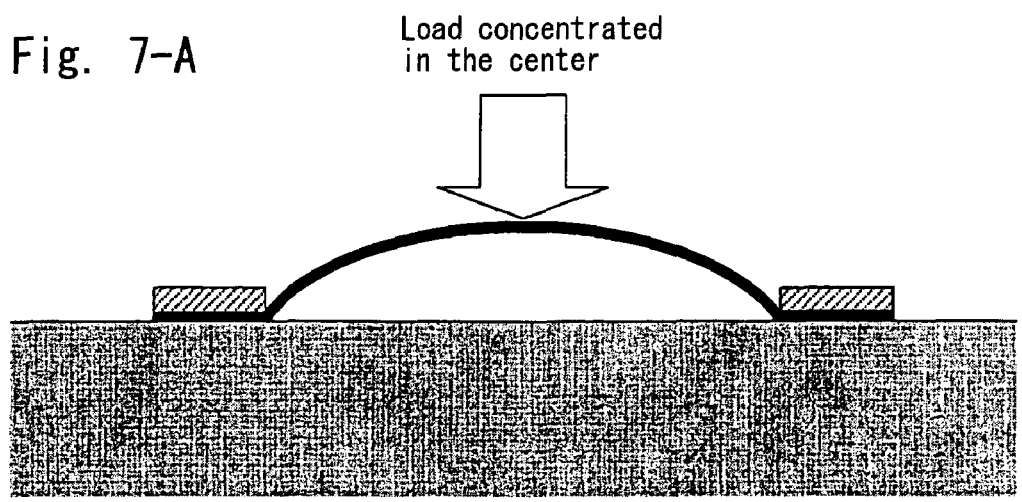
Load concentrated in the center
Fig. 7-B
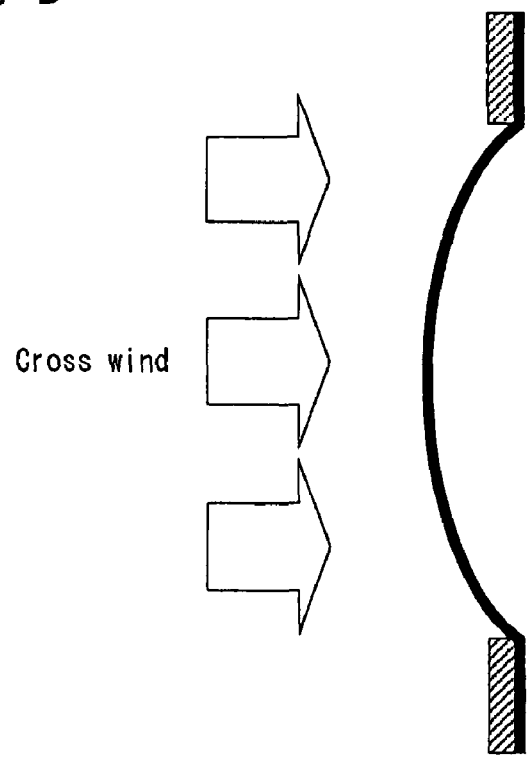
Cross wind

ULTRA-LIGHTWEIGHT ELECTROMAGNETIC WAVE CONCENTRATOR AND METHOD FOR MANUFACTURE THEREOF

BACKGROUND OF THE INVENTION

1. Field of the Invention

The present invention relates to an electromagnetic wave concentrator, and more particularly to an electromagnetic wave concentrator suitable as a concentrate device for solar energy utilization or electromagnetic wave transceiver for communications, which is used for transmitting and receiving signals, and to a method for the manufacture thereof.

2. Description of the Related Art

The conventional electromagnetic wave concentrators have been manufactured by coating a lightweight thermoplastic resin with a high rigidity, such as CFRP (carbon fiber reinforced plastic) on an electromagnetic wave reflective surface typically obtained by molding a metallic thin film or net into the form of a paraboloid of revolution. The weight of such electromagnetic wave concentrators has been reduced by employing a structure in which a thermoplastic resin was coated on a metallic molded surface, but it was difficult to make a greater weight reduction further lowering the weight limit. When strict limitations are placed on the weight, such as in an electromagnetic wave concentrators for a space, a noticeable reduction in weight based on epoch-making technological improvement is required.

In order to reduce the weight further, a gas-inflatable electromagnetic wave concentrator has been considered in which a paraboloid of revolution is formed by subjecting an elastic film surface, e.g., a rubber surface to gas pressure. However, a paraboloid of revolution basically cannot be molded with sufficient precision by the gas inflation process. Furthermore, another transparent film has to be provided on the side of the reflective surface to seal the gas. In use, electromagnetic waves pass twice through the transparent film: once before reaching the reflective surface and once after the reflection from the reflective surface, and the loss therein is rather large. Furthermore, in the case of electromagnetic wave concentrators for space, if the holes are opened in the film due to collision of space debris with the electromagnetic wave concentrators, the gas starts to leak, making it impossible to maintain the gas pressure, and the form of a paraboloid of revolution cannot be maintained.

Accordingly, molding an electromagnetic wave concentrator from a single thin film, without gas inflation, can be considered. However, the following problem is associated with electromagnetic wave concentrators with a thin-film structure. It is precisely because of their thin-film structure that the rigidity of the reflective surface is very small and the shape of the reflective surface can easily collapse or turn inside out under the effect of vibrations or load. A thin-film electromagnetic wave concentrator can be fabricated by employing thermoplastic hardening of resins. However, the problem associated with such electromagnetic wave concentrators is that they have poor flexibility and can be easily cracked or deformed by impacts.

Further, there is also a method for increasing the rigidity of electromagnetic wave concentrators by coating the reflective film with a thermoplastic resin, as disclosed in Japanese Patent Applications Laid-open Nos. H5-305662 and H6-6127. However, with this method, the weight of electromagnetic wave concentrators is increased and when the concentrator has to be spread over a large surface area, in particular, as in space applications, it becomes a disadvantage from the standpoint of launching cost.

A method described in Japanese Patent Application Laid-open No. S62-168402, by which molding, mainly of metal materials, is conducted by inducing plastic deformation in a press by using a molding die, can be also considered, but the slip of metal atoms occurring during processing produces wrinkles on the reflective surface, and the decrease in reflection factor caused by the wrinkles is fatal, in particular, in the case of light concentrate mirrors.

SUMMARY OF THE INVENTION

In particular, in the electromagnetic wave concentrators used for space applications, a significant decrease in weight is required to reduce the launching cost. Furthermore, the gas-inflated electromagnetic wave concentrators have a low reliability with respect to space debris and rigidity thereof is difficult to increase. Accordingly, an ultra-lightweight electromagnetic wave concentrator is required which has flexibility and endurance against external impacts and in which the shape of the reflective surface can be maintained even under vibrations or load. It is an object of the present invention to provide an electromagnetic wave concentrator meeting those requirements.

The ultra-lightweight electromagnetic wave concentrator in accordance with the present invention comprises a thin-film curved body that is molded by the effect of stress relaxation in a thin-film material and has a reflective surface that assumed the surface shape that is a part of the paraboloid of revolution or of the curved surface modeling same, wherein a reinforcing structure is formed in the peripheral zone of the reflective surface to increase the rigidity of the thin-film curved body.

Further, the method for the manufacture of an ultra-lightweight electromagnetic wave concentrator in accordance with the present invention comprises the steps of molding a thin-film curved body by the effect of stress relaxation in a thin-film material by heating the thin-film material in a state in which the thin-film material is attached to a molding die by pressure, and forming a reflective surface that assumes the surface shape that is a part of a paraboloid of revolution or of a curved surface modeling same and a reinforcing structure formed in the peripheral zone of the reflective surface on the surface of the thin-film curved body by the molding surface of the molding die.

A molding die is typically required to mold a thin-film material so that it assumes the form of a reflective surface, but the inventors have discovered that molding can be conducted by attaching a thin-film material to a molding die by pressure, thereby causing the thin-film material to assume the shape of the molding die, and inducing stress relaxation in the thin-film material by heating with a heating device such as a thermostatic chamber, while maintaining the assumed shape. With such a method, a molded shape close to the molding die shape can be realized by heating within a temperature range in which annealing is possible in the case of metal materials or at a temperature of no less than the glass transition temperature and no more than decomposition temperature in the case of non-metallic materials, in particular, polymeric materials.

With the ultra-lightweight electromagnetic wave concentration in accordance with the present invention and a method for the manufacture thereof, which are based on the above-described knowledge, a thin-film curved body is molded by the effect of stress relaxation in a thin-film material. Therefore, an electromagnetic wave concentrator of a very small weight which has a high rigidity and also flexibility can be molded, though the thin-film curved body has a very thin structure. Furthermore, the surface thereof can be the reflective surface that assumes the form of part of a paraboloid of revolution or of a curved surface modeling same. Moreover, since a reinforcing structure is formed in the peripheral zone of the reflective surface, the rigidity of the peripheral zone of the reflective surface can be increased. As a result, the surface shape of the reflective surface can be maintained because it is surrounded by the peripheral portion with increased rigidity. The curved surface modeling a paraboloid of revolution as referred to herein is a curved surface which is close to a paraboloid of revolution to a degree such that the difference therebetween is not essential in terms of usage for electromagnetic wave concentration.

In this ultra-lightweight electromagnetic wave concentrator and method for the manufacture thereof, the above-mentioned reinforcing structure can be molded by the effect of stress relaxation simultaneously with the molding of the thin-film material. With such a molding of the reinforcing structure, the reinforcing structure can be molded simultaneously with the molding of the thin-film curved body by the effect of stress relaxation.

In this ultra-lightweight electromagnetic wave concentrator and method for the manufacture thereof, the reinforcing structure can be formed in the reflective surface. Forming the reinforcing structure in the reflective surface makes it possible to increase further the rigidity of the ultra-lightweight electromagnetic wave concentrator composed of a thin-film curved body. Further, forming the reinforcing structure in the reflective surface simultaneously with the molding of the thin-film curved body by the effect of stress relaxation also makes it possible to simplify the process of molding the ultra-lightweight electromagnetic wave concentrator and to manufacture the ultra-lightweight electromagnetic wave concentrator at a low cost. Thus, if groove-like or net-like peaks or valleys are provided on the molding die, then shapes corresponding to those peaks and valleys can be formed in the molded thin film. As a consequence, the rigidity in this portion is increased and the rigidity of the entire film can be increased despite a very small weight thereof. The ultra-lightweight electromagnetic wave concentrator thus manufactured has a very high resistance to shape collapse or turning upside down and a highly precise paraboloid of revolution can be maintained without adding a special reinforcing material.

In this ultra-lightweight electromagnetic wave concentrator and method for the manufacture thereof, a reinforcing agent can be coated or a reinforcing material can be arranged over the entire or part of the reinforcing structure or over the entire or part of the back side of the reflective surface or part thereof. Coating a reinforcing agent or arranging a reinforcing material makes it possible to increase further the rigidity of the thin-film curved body, despite a small weight thereof, while reducing to minimum the effect produced by the reflective surface on the concentration of electromagnetic waves.

As described above, with the method for the manufacture of the ultra-lightweight electromagnetic wave concentrator, a very thin and lightweight electromagnetic wave concentrator can be manufactured. However, in the molding conducted by the present technique, elastic deformation cannot be suppressed completely, and if the pressure attaching the thin-film material to the molding die is released, the material will return to its original shape to the degree determined by this elastic deformation. As a result, the processed shape is sometimes different from that of the molding die. For this reason, in the method for the manufacture of the ultra-lightweight electromagnetic wave concentrator in accordance with the present invention, the molding surface of the molding die is formed as a surface obtained by adding the return corresponding to the elastic deformation causing the return of the thin-film material to its original shape when the pressure attaching the thin-film material to the molding die is released to the shape of the surface comprising the surface shape which has to be assumed by the thin-film curved body, rather than forming the molding surface of the molding die exactly as a paraboloid of revolution. Therefore, forming the molding surface of the molding die by taking into account the return (several percent) to the original shape corresponding to the elastic deformation at the time the pressure acting during molding is released from the thin-film material makes it possible to conduct the molding of the surface shape of the thin-film curved body as a highly precise paraboloid of revolution when the thin-film material returns to the original shape.

In the molding process conducted by the present technique, the shape after processing depends greater on the heating temperature than on the heating time, and the processed shape can be varied within a range of several percent of the molding die shape by changing the heating temperature. Accordingly, in the present manufacturing method, adjusting the temperature of the molding die makes it possible to conduct the adjustment matching the reflective surface of the thin-film curved body with the surface shape. Thus, changing the heating temperature of the thin-film material makes it possible to conduct fine adjustment of the processed shape and to mold he thin-film material into a more precise form of a paraboloid of revolution.

In the ultra-lightweight electromagnetic wave concentrator, the reinforcing structure of which is molded in said reflective surface, the reinforcing structure may be formed in radially extending linear configuration or ring-like concentric configuration.

In the ultra-lightweight electromagnetic wave concentrator, said reinforcing structure may be formed in the shape of ridge or groove.

BRIEF DESCRIPTION OF THE DRAWINGS

FIGS. 1-A and 1-B are a perspective view and a photo, respectively, illustrating an embodiment of the electromagnetic wave concentrator in accordance with the present invention;

FIGS. 2-A and 2-B are photos illustrating another embodiment of the electromagnetic wave concentrator in accordance with the present invention;

FIGS. 4-A and 4-B are a figure and a photo, respectively, illustrating an example of the reinforcing molding die of the electromagnetic wave concentrator in accordance with the present invention;

FIGS. 5-A and 5-B are explanatory drawings showing the shape of the electromagnetic wave concentrator in accordance with the present invention in the vicinity of center thereof under changing manufacturing conditions relating to heating time and heating temperature in the method for the manufacture of the electromagnetic wave concentrator in accordance with the present invention;

FIGS. 6-A and 6-B are, respectively, a photo of a solar focal image which represents an embodiment of the electromagnetic wave concentrator in accordance with the present invention and a graph illustrating the distribution of quantity of light along the line passing through the center of the solar focal image; and FIGS. 7-A and 7-B are, respectively, a view illustrating schematically a test in which the load is applied to the center and a test in which the load is distributed over the film surface, those tests being conducted to study the rigidity of the electromagnetic wave concentrator in accordance with the present invention.

DESCRIPTION OF THE PREFERRED EMBODIMENTS

Figure 3:
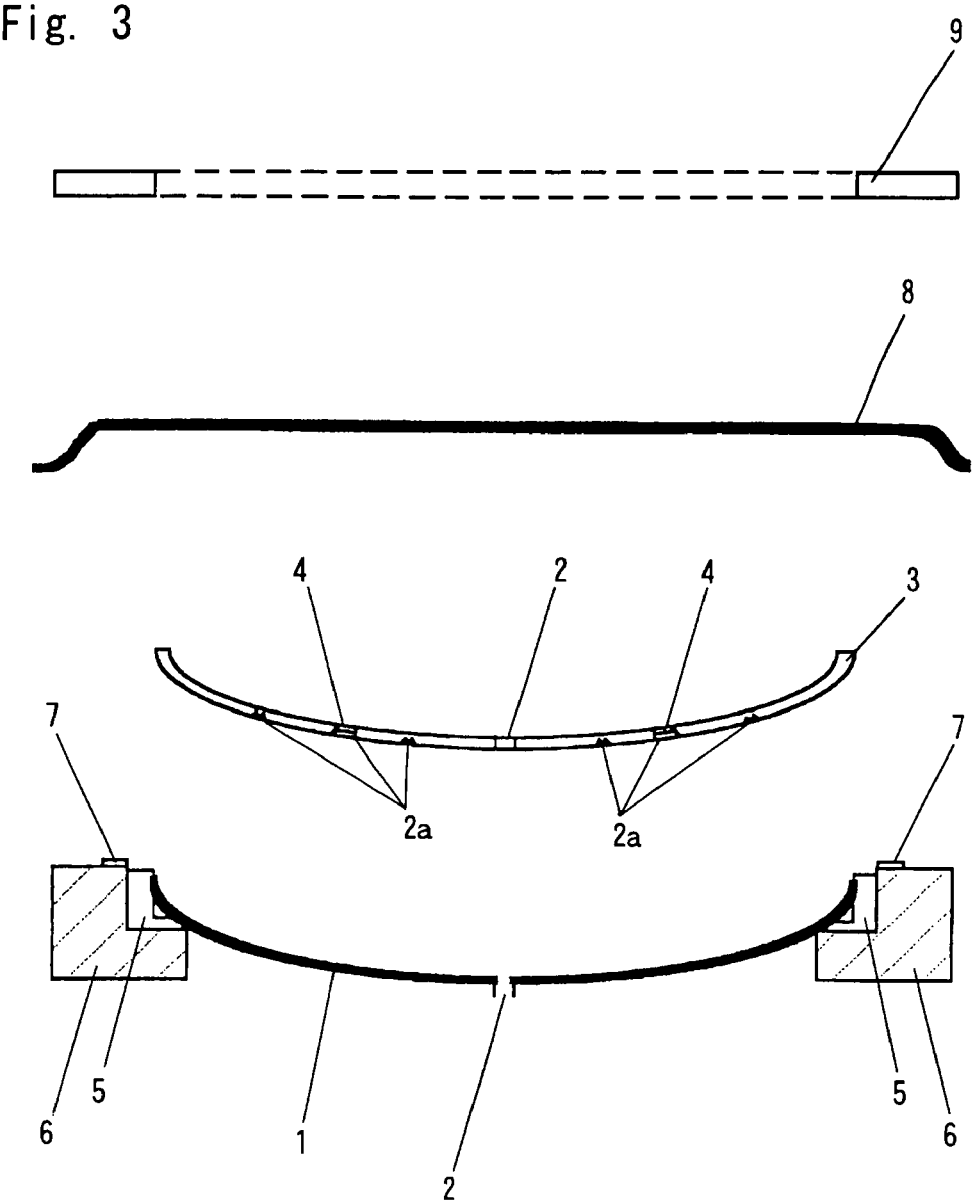
FIG. 3 illustrates schematically a method for the manufacture of the electromagnetic wave concentrator in accordance with the present invention by stress relaxation.

The ultra-lightweight electromagnetic wave concentrator in accordance with the present invention (referred to simply hereinbelow as "electromagnetic wave concentrator") and a method for the manufacture thereof will be described below with reference to the drawings. FIG. 1 illustrates an axially symmetric example of the electromagnetic wave concentrator in accordance with the present invention. FIG. 1-A is a schematic view of the electromagnetic wave concentrator, FIG. 1-B is a photo thereof.

An electromagnetic wave concentrator 10 shown in FIG. 1 comprises a thin-film curved body formed by subjecting an aluminum-deposited polyester film as a thin-film material to molding accompanied by the effect of stress relaxation. A reflective surface 11 is formed correspondingly to the molding surface of the molding die on the surface of the thin-firm curved body. The reflective surface 11 is a paraboloid of revolution or part of the curved surface simulating such (referred to simply hereinbelow as "paraboloid of revolution"). The electromagnetic wave concentrator 10 is, for example, an axially symmetric electromagnetic wave concentrator with a diameter of 22 cm and a focal distance of 10 cm. Reinforcing grooves 13, 14 with a concave cross section as reinforcing structures are formed on the reflective surface 11, and linear or ring-like reinforcing grooves 15 with a concave cross section are also formed in a peripheral zone 12. In the present embodiment, the reinforcing grooves 13, 14 are formed as a cross-like pattern and one concentric circle on the reflective surface 11, and the cross section of the reinforcing grooves 13–15 is of a concave rectangular shape. However, the number and arrangement of reinforcing grooves 13–15 are not limited to those shown in the figure, and a plurality of radial grooves or additionally concentric circular grooves of different radius may be provided. The reinforcing structures may be embodied not only in the form of grooves with the cross section of concave, also in the form of ridges with the cross section of convex. The cross-sectional shape of the reinforcing structures may be a combination of convex and concave sections and is not necessarily a rectangular shape. Thus, it may be of a rectangular or semicircular shape, and sides having a height in the thickness direction may be present.

FIG. 2 is a photo illustrating another embodiment of the electromagnetic wave concentrator in accordance with the present invention. An electromagnetic wave concentrator 20 shown in FIG. 2-A comprises a thin-film curved body obtained by molding an aluminum-deposited polyester film as a thin-film material with a molding die. The electromagnetic wave concentrator 20 is, for example, an axially symmetric electromagnetic wave concentrator with a diameter of 22 cm and a focal distance of 10 cm, which is used when specific limitations are placed on the usage environment. In the reflective surface 11 of the thin-film curved body, a ring-like reinforcing groove 15 is formed only in the peripheral zone 12, and uniformity of the reflective surface 11 provides for a high concentration efficiency. For example, in a limited number of cases in which a force acting during launching is only an inertia force in the specific direction and the forces acting in space after launching are almost balanced, even the electromagnetic wave concentrator 20 in which the ring-like reinforcing groove 15 is provided only in the peripheral zone 12 of the reflective surface 11 can have a sufficient utility. An electromagnetic wave concentrator 30 relates to an embodiment in which in the electromagnetic wave concentrator 1 shown in FIG. 1 the reinforcing groove 13 formed to have a cross-like shape and the reinforcing groove 15 formed in the peripheral zone 12 are provided in the reflective surface 11 and the ring-like groove 14 provided in the reflective surface 11 is omitted.

FIG. 3 illustrates schematically a method for the manufacture of the electromagnetic wave concentrator in accordance with the present invention. With the method shown in FIG. 3, a thin-film material 8 composed of a reflective material is attached by pressure to a molding die 1 by vacuum suction. An air orifice 2 for vacuum suction is formed in the molding die 1, the air orifice 2 is connected to a vacuum pump (not shown in the figure), and the space between the molding die 1 and the thin-film material 8 is evacuated by the vacuum pump via the air orifice 2. In this process, a fluid pressure (because in most cases the manufacture is conducted in the air, the air pressure) acts upon the upper surface of the thin-film material 8, and the molding die 1 and the thin-film 8 are attached to each other by the fluid pressure. A sealing material 7 is provided on a support stand 6 so as to surround the molding die 1. The sealing material 7, together with a frame-like pressure member 9 which is pushed down from the upper side, serve to provide for vacuum sealing of the space between the molding die 1 and the thin-film material 8 by sandwiching the thin-film material 8 between the sealing material 7 and the pressure member 9. At the same time, the sealing material 7 can form the ring-like reinforcing groove 15 in the peripheral zone 12 around the portion of the thin-film material 8 that will become the reflective surface 11, under the pressure applied by the pressure member 9. When the reinforcing grooves 13, 14 are formed on the reflective surface 11, vacuum suction is conducted by arranging one of the linear reinforcing groove molding die 3 and the ring-like reinforcing groove molding die 4 or both dies between the molding die 1 and the thin-film material 8 so as to make intimate contact with the molding die 1.

The above-described configuration composed of the molding die 1, linear reinforcing groove molding die 3, ring-like reinforcing groove molding die 4, thin-film material 8, and pressure member 9 is placed in a heating device (not shown in the figure) such as a thermostatic chamber and the like, while maintaining the vacuum suction state. The thin-film material 8 is heated for a predetermined time at a temperature of no less than a temperature at which annealing is possible and not higher than the melting point when the thin-film material 8 is a metal, and at temperature of no less than a glass transition temperature and no more than a decomposition temperature when a polymer material is used, and the molding process is conducted by stress relaxation inside the thin-film material 8. Thus, a thin-film curved body normally having a shape with relaxed internal stresses is formed by relaxing the stresses that have occurred in the thin-film material 8 under the pressure that attached the thin-film material 8 to the molding die 1. Because this method does not rely upon the thermoplastic effect, the thin-film material 8 can be selected from a wide range of materials and an ultra-lightweight electromagnetic wave concentrator having flexibility even after molding can be fabricated. One of the specific features of the device is that because the flexibility is demonstrated even after molding, vibrations and external forces cause no brittle fracture.

Means for bringing the molding die 1 and the thin-film material 8 into intimate contact is not limited to that using evacuation, and a press method may be also used, this method comprising the steps of pushing the molding die 1 down from the upper surface of the thin-film material 8 and sandwiching it between the support stand 6 and the pushing member 9. In this case, the reinforcing groove molding dies 3 and 4 cover the lower surface of the molding die 1 or are arranged on the upper surface of the thin-film material 8. In this state, an ultra-lightweight electromagnetic wave concentrator can be fabricated by using a heating-induced stress relaxation effect under the temperature and time conditions same as described above.

FIG. 4 shows a reinforcing groove molding die for forming reinforcing grooves on a reflective surface. FIG. 4-A shows a plan view and a cross-sectional view of the reinforcing groove molding die, and FIG. 4-B is a photo showing the reinforcing groove molding die that was actually used and an electromagnetic wave concentrator fabricated by using same. For example, it is an axially symmetric electromagnetic wave concentrator with a diameter of 22 cm and a focal distance of 10 cm. The linear reinforcing groove molding die 3 or ring-like reinforcing groove molding die 4 used for forming the reinforcing grooves 13–15 are formed by arranging the linear reinforcing groove molding die 3 to assume a cross-shaped configuration and assembling therewith the ring-like reinforcing groove molding die 4 passing in the vicinity of the center in the lengthwise direction thereof, on the inner side of the sealing material 7. Examples of materials for the reinforcing groove molding die 3 and 4 and the sealing material 7 include a silicon rubber if the heating temperature is no higher than 200° C. and heat-resistant materials or metal materials if the temperature is higher. When the ring-like reinforcing groove molding die 4 is used, with certain positions of the air orifice 2 vacuum sealing is conducted with the ring-like reinforcing groove molding die 4, evacuation becomes incomplete in parts of the molding die 1 and zones are present where the thin-film material 8 is not in intimate contact with the molding die 1. Accordingly, evacuation can be conducted over the entire surface of the thin-film material 8 by providing the air orifice 2a (see cross section C–C' in FIG. 4-A) in the ring-like reinforcing groove molding die 4. Further, in order to conduct more reliable evacuation over the entire surface of the thin-film material 8, the air orifice 2a is preferably also provided in the linear reinforcing groove molding die 3.

The arrangement and number of the linear reinforcing groove molding die 3 and ring-like reinforcing groove molding die 4 are not limited to the above-described embodiment. For example, the linear reinforcing grooves 13 may be arranged radially, or the ring-like reinforcing grooves 14 may be omitted, or no less than two thereof may be provided. Furthermore, the cross-sectional shape of the linear reinforcing groove molding die 3 and ring-like reinforcing groove molding die 4 is not limited to the rectangular shape, and any shape with a side having a height in the thickness direction of the thin-film material 8, for example, a triangular or semi-circular shape, may be used. Alternatively, the molding die 1, linear reinforcing groove molding die 3, and ring-like reinforcing groove molding die 4 may be provided not as separate components and the reinforcing groove shape may be obtained by additional processing in the molding die 1. In this case, both the convex ridge shape and the concave groove shape of reinforcing structures can be obtained by the evacuation method, whereas only convex reinforcing grooves can be obtained in the molding die 1 by the press method. However, the shape of reinforcing grooves is not limited to the convex shape if the air opening 2a is provided in the reinforcing groove portion of the molding die.

When the surface in the reinforcing grooves 13 and 14 provided in the reflective surface 11 of the thin-film material 8 is not parallel to the reflective surface 11, this portion cannot be expected to function as a concentrating reflective surface. However, the width of such reinforcing grooves 13, 14 can be made comparatively small and reduced to a level producing practically no effect, in terms of the surface area ratio to the entire reflective surface 11. Therefore, the reduction in the electromagnetic wave concentration efficiency of the entire structure due to the presence of reinforcing grooves 13, 14 can be considered to produce practically no effect.

FIG. 5 is an enlarged view of the central portion of the electromagnetic wave concentrator, wherein the shape of the device after processing is shown in comparison with the shape of the molding die. The electromagnetic wave concentrator with a diameter 60 cm has no reinforcing grooves 13, 14 on the reflective surface 11 and has only a ring-like reinforcing groove 15 in a peripheral zone 12. FIG. 5-A relates to the case when the heating temperature was constant (120° C.) and the heating time was varied, and FIG. 5-B relates to the case when the heating time was constant (3 hours) and the heating temperature was varied. FIG. 5 makes it clear that the shape of the electromagnetic wave concentrator after molding depends more on the heating temperature than on the heating time. Molding is conducted by the effect of stress relaxation under heating, but the elastic deformation of the thin-film material 8 cannot be removed completely and the shape is obtained which is shallower than the molding die 1 by about 2% as a maximum. Here, using the molding die 1 in the form of paraboloid of revolution that takes account of this elastic deformation makes it possible to absorb the return to the original shape corresponding to this elastic deformation after the thin-film material 8 has been molded and to obtain the reflective surface 11 of the thin-film curved body in the form of highly precise original paraboloid of revolution. In this case, fine adjustment of the molding process can be conducted by changing the heating temperature and the reflective surface 11 can be formed as a more precise paraboloid of revolution. Further, as the heating time is being extended, the curve obtained gets closer to the curve representing the molding die, but at the scale shown in FIG. 5-A the curves practically coincide.

A solar ray concentrate mirror is an example of the usage mode of the electromagnetic wave concentrator in accordance with the present invention. FIG. 6 is a photo of the focal image and a graph illustrating the distribution of quantity of light in the case when the electromagnetic wave concentrator was used as a solar ray concentrate mirror. The solar ray concentrate mirror has a diameter of 22 cm and a focal distance of 10 cm, comprises no reinforcing grooves 13, 14 on the reflective surface and has only a ring-like groove 15 formed in a peripheral zone 12. FIG. 6-A is a photograph of the focal image of the mirror, and FIG. 6-B is a graph illustrating the distribution of quantity of light along the line passing through a diameter thereof. FIG. 6-B also shows a regression curve obtained by the least square method under as assumption that the distribution of quantity of light is a Gaussian distribution. FIG. 6-A demonstrates that though the solar ray condensed image is not a perfect circle, the distribution thereof is almost a Gaussian distribution. The diameter of the solar ray condensed image is by about 10% larger than that of the molding die, but if the difference caused by the above-described elastic deformation is removed, this diameter will apparently become closer to that of the solar ray condensed image of the molding die.

FIG. 7 is a graph illustrating the results of a rigidity test conducted on the electromagnetic wave concentrator in accordance with the present invention. FIGS. 7-A and 7-B respectively illustrate a center concentrated load test mode and a wind pressure resistance test mode of the rigidity test. In the rigidity test, the electromagnetic wave concentrator had a diameter of 22 cm, comprised reinforcing grooves 13–15 and was obtained by molding an aluminum-deposited polyester film with a thickness of 50 µm as a thin-film material. In the center concentrated load test, a concentrated load was applied to the central portion of the electromagnetic wave concentrator placed on a horizontal base so as to be convex upwards. As a result, when no reinforcing groove was formed in the reflective surface, buckling occurred under a load of 7 g and the paraboloid of revolution shape of the reflective surface was not restored even after the load was removed. By contrast, when the reinforcing grooves were provided in the reflective surface shown in FIG. 1, no buckling occurred up to a load of 25 g. Thus, the reinforcing grooves of this type increased the resistance of film to loading to triple or more. Similarly in the wind resistance test, when no reinforcing groove was formed in the reflective surface, the reflective surface was turned inside out at a wind speed of about 3.3 m/s, whereas when the reinforcing grooves were provided in the reflective surface shown in FIG. 1, the resistant to load was increased to triple or more.

As described above, with the ultra-lightweight electromagnetic wave concentrator in accordance with the present invention, applying a pressure to the thin-film material with the molding die or attaching the thin-film material to the molding die by a pressure makes it possible to induce stress relaxation in the thin-film material by heating the thin-film material with a heating device such as a thermostatic chamber, while maintaining this state, and to implement a process for molding the electromagnetic wave concentrator into a shape close to that of the molding die. Although the electromagnetic wave concentrator is very thin and lightweight, a high rigidity and also flexibility can be provided and a highly precise reflective surface can be obtained. Furthermore, because a reinforcing structure is formed in the peripheral zone of the reflective surface, the rigidity of the peripheral zone of the reflective surface can be increased. As a result, the surface shape of the reflective surface surrounded by the peripheral zone with the increased rigidity is maintained and the concentration efficiency can be increased. Provided that no peripheral support materials are comprised, the weight of the electromagnetic wave concentrator itself increases in the order as follows: a concentrator in which only the reinforcing structures are formed and neither a reinforcing agent is coated nor a reinforcing material is arranged, a concentrator in which a reinforcing agent is coated or arranged over the entire reinforcing structure or part thereof, and a concentrator in which a reinforcing agent is coated or a reinforcing material is arranged over the entire or part of the back side of the reflective surface or part thereof, but even the weight of the heaviest among those concentrators can be reduced to about one several tenth of the conventional electromagnetic wave concentrator made from CFRP. When such a concentrator serves as a space antenna carried by an artificial satellite, the launching cost can be thus reduced to about one several tenth of the original cost and the corresponding quantity of other materials can be carried by the artificial satellite. Thus, an artificial satellite with a larger number of onboard devices can be launched at the same cost, or an artificial satellite with the same number of onboard devices can be launched at a lower cost.

What is claimed is:

1. An ultra-lightweight electromagnetic wave concentrator comprising a thin-film curved body that is molded by the effect of stress relaxation in a thin-film material and has a reflective surface that assumes the surface shape that is part of a paraboloid of revolution or of a curved surface modeling the same, wherein a reinforcing groove structure is formed at least in the peripheral zone of said reflective surface and the reinforcing groove structure is molded in said reflective surface to increase the rigidity of said thin-film curved body.

2. The ultra-lightweight electromagnetic wave concentrator according to claim 1, wherein said reinforcing groove structure is molded by said effect of stress relaxation simultaneously with the molding of said thin-film curved body with said thin-film materials.

3. The ultra-lightweight electromagnetic wave concentrator according to claim 1, wherein said reinforcing groove structure is formed in radially extending linear configuration or ring-like concentric configuration.

4. The ultra-lightweight electromagnetic wave concentrator according to claim 1, wherein said reinforcing groove structure is formed in the shape of ridge or groove.

5. The ultra-lightweight electromagnetic wave concentrator according to claim 1, wherein a reinforcing agent is coated or arranged over the entire or part of said reinforcing groove structure, or over the entire or part of the back side of said reflective surface.

* * * * *